United States Patent Office 3,642,953
Patented Feb. 15, 1972

3,642,953
SELECTIVELY SULFONATED BLOCK CO-POLYMERS AND PROCESS FOR THEIR PREPARATION
William P. O'Neill, Emeryville, Calif., and Walter V. Turner, Jr., Urbana, Ill., assignors to the United States of America as represented by the Secretary of the Department of Health, Education, and Welfare
No Drawing. Filed May 20, 1970, Ser. No. 39,165
Int. Cl. C08f *15/04, 27/06*
U.S. Cl. 260—880
5 Claims

ABSTRACT OF THE DISCLOSURE

Elastic block copolymer containing a polyelectrolyte segment, prepared by selective sulfonation of unsaturated block copolymers wherein the sulfonation is exclusively confined to the unsaturated elastomeric segments, and the plastic segments are unaltered, exhibit water absorption characteristics, and properties when swollen with water which indicate their utility for use as construction materials of devices for surgical implantation or for blood circulation and oxygenation. Additionally, these block copolymers have class utility as reinforcing material for natural and synthetic rubbers, for modification of rubber-based adhesives, and for high impact plastics. Encyclopedia of Polymers Technology (EPT), volume 2, 1965, pages 485, 507, and 517 (Interscience—Wiley). The process for preparation employs complexes of chlorosulfonic acid with ethers to obtain selective sulfonation of the elastomeric segment only.

---

This invention is concerned with the production of certain selectively sulfonated block copolymers. More particularly, it is directed to the production of water swellable block copolymers containing sulfonate substituents in the elastomeric portions thereof, which maintain a high order of mechanical properties despite an ionic character and water content which improves their compatibility with the physiological environment.

The sulfonation of many types of polymers has been studied for the particular purpose of producing ion exchange resins. Such materials may be useful in bead or sheet form but they have the disadvantage for many applications of being brittle when dry and very weak in water. To maintain integrity they must be chemically cross-linked before sulfonation, and, therefore, cannot be formed by solution or as melt processes. There is evidence that some sulfonated polyelectrolytes have greater compatibility with living tisuse and blood than most other synthetic materials. This is probably due to their water content and ionic character which resemble biological materials.

It would be especially desirable to have available a polymer which is an anionic polyelectrolyte with high water absorption capacity but which also possesses practical mechanical, especially elastic, properties for applications which require a material with strength and flexibility. It is also desirable to be able to form such a material into complicated shapes by such techniques as solution casting.

Three segment block copolymers, in which an elastomeric segment has attached at each end of it a segment of a glassy plastic polymer, have been shown to display rubber-like mechanical properties without chemical cross-linking with its irreversible effect on solubility and moldability. The properties of these so-called thermoplastic elastomers are explained in terms of entrapped chain entanglements in the elastomeric segment occurring as a result of the incompatibility of the end and center polymers. However, these materials are usually neutral and hydrophobic.

It is an object of the present invention to provide an elastomeric block copolymer with anionic substituents especially for fabrication of devices for surgical implantation and for blood circulation, as well as for other application demanding ionic characteristics, water swellabliity and mechanical strength. It is a particular object of the invention to provide such a polymer which has practical mechanical properties, along with a high degree of sulfonate substitution and a high equilibrium water capacity.

These block polymers additionally have utility as reinforcing material for natural and synthetic rubbers, for modification of rubber-based adhesives, and for high impact plastics. Encyclopedia of Polymer Technology (EPT), volume 2, 1965, pages 485, 507, and 517 (Interscience—Wiley).

Now, in accordance with the present invention, novel elastomeric block copolymers are provided having a selectively sulfonated conjugated diene polymer block and two non-sulfonated monovinyl arene polymer blocks. Further, in accordance with the present invention, a process for selective sulfonation of such polymers is provided wherein the ABA block copolymers, as further described hereinafter, are reacted with chlorosulfonic acid in the presence of an ether. The product of the sulfonation is an unsaturated sulfonic acid, which is converted to the salt form by neutralization or ion-exchange.

It has been found that this class of block copolymers, selectively sulfonated in the conjugated diene block, exhibits highly desirable water swellability and retains useful, elastic, mechanical properties despite the imbibition of large quantities of water. Since the monovinyl arene polymer blocks are substantially unaffected by the sulfonation process, the physically cross-linked structure of the parent hydrocarbon polymers in the solid state is retained. Although sulfonation renders a block polymer somewhat stiff in the absence of water, when a sulfonated polymer is swollen with water, it has quite good mechanical properties.

These compositions, when swollen with water, have utility as sulfonated block polymers for artificial internal organs, blood pumps, and other artifacts in animals.

The block copolymers utilized in the formation of these selectively sulfonated derivatives must have a block of a conjugated diene polymer or a partially hydrogenated conjugated diene polymer separating two blocks of a monovinyl arene polymer. The polymer configuration is expressed as ABA, in which the polymer blocks A comprise monovinyl arene polymer blocks while the B indicates a polymer block of a conjugated diene or a partially hydrogenated polymer block of a conjugated diene. Preferably, the blocks A have average molecular weights between about 5,000 and 75,000 while the polymer blocks B have average molecular weights between about 20,000 and about 250,000. A typical block copolymer will have the formulation polystyrene-polyisoprene-polystyrene. Preparation of such polymers is described in U.S. Pat. 3,265,765. By "partially hydrogenated" is meant that the conjugated diene double bonds are hydrogenated to an extent of 10–70% of the original diene unsaturation.

It is important, in order to obtain block copolymers sulfonated only in the center segment and with hydrophobic end segments which preserve the physical cross-links, that the sulfonation be conducted with a reagent which will react only with unsaturated olefinic polymers and not with aromatic polymers. In order to obtain this selectivity, it was found necessary to employ an electron-donor, such as the ether oxygen to complex with chlorosulfonic acid and by so reducing the electrophilicity of the reagent, virtually eliminate its tendency to attack a benzene ring. Chlorosulfonic acid uncomplexed will react with both types of segments in the ABA polymers described above. The selectivity of the reaction of chlorosulfonic acid-ether complexes has been demonstrated herewith toward unsaturated olefinic polymers but not with aromatic polymers by appropriate experiments with homo-polyisoprene and homo-polystyrene. Typical ethers for this purpose include dialkyl ethers, such as dimethyl or diethyl ether and cyclic ethers such as tetrahydrofuran. An ether is employed as both complexing agent and solvent for the starting materials of the reaction. The products may or may not be soluble in the ether.

Nuclear magnetic resonance spectrum of the polyisoprene sulfonate suggests that most of the sulfonic groups are on carbon-3 of the isoprene unit with the carbon-carbon double bond rearranged to the 1,2-position (beta, gamma-to the acid).

Optimum results are obtained with reasonable rates of reaction at temperatures on the order of −10 to +10° C. The time of reaction is normally between instantaneous reaction and up to about two hours depending on the starting polymer and degree of sulfonation desired.

While chlorosulfonic acid is the agent employed in the present reaction, HCl is eliminated during the reaction, and an unsaturated product is obtained. The sulfonated product contains very little, if any, chlorine. Even at sulfonate levels of 16% or more sulfur, the products have been found to contain less than 0.5% chlorine. The degree of sulfonation may be controlled by the proportion of chlorosulfonic acid relative to the conjugated diene linkages available and will be controlled for specific end use purposes. It is possible to sulfonate at least half of the available unsaturated units of the elastomer segments in the center block by this process. It is preferred for the applications discussed herein to sulfonate to a substantially lower level, e.g., between about 1 and 10% sulfur, preferably 3–7% by weight of sulfur.

The unsaturated block polymer sulfonic acids obtained by this process are subject to rapid oxidative degradation in air, therefore, they must be handled under anaerobic conditions and/or stabilized with anti-oxidants until they have been cast from solution into their final form and converted to the more stable salt by neutralization or ion-exchange.

Tetrahydrofuran is generally a good solvent for casting artifacts of the sulfonated block polymers. Normally, 5–25% solutions of the sulfonated polymers are used to cast or coat artifacts in a dust-free nitrogen atmosphere. After the solvent is evaporated, the solid object is treated with an excess of physiological saline (maintained by buffer at pH >8) or with 0.1–1.0 N sodium hydroxide. This treatment removes any excess chlorosulfonic acid remaining from the sulfonation reaction and converts the polymeric acid to the salt form.

If desired, the block copolymer may be partially hydrogenated in order to increase oxidative stability. Since some olefinic unsaturation is necessary for the preparation of the selectively sulfonated derivatives, at least a portion of the original unsaturation must be retained after a hydrogenation step. Also, since the monovinyl arenes are slower to hydrogenate than the olefinic unsaturation, the resultant partially hydrogenated block copolymers especially contemplated are those in which the polymer blocks A are unconverted monovinyl arene polymer blocks while the polymer blocks B are partially hydrogenated, e.g., between about 10% and about 70% of the original unsaturation is reduced by hydrogenation. The partial hydrogenation of the conjugated diene polymer blocks is not essential but may be desirable to increase the stability of the sulfonated product. Hydrogenation of block polymers is disclosed in Belgian Pat. No. 657,590.

The several methods for the preparation of these types of block copolymers are generally known in the art. Lithium initiators are preferred, such as the lithium alkyls.

A sequential process may be employed in which the individual monomers are injected into the polymerization mixture, preferably in the presence of an inert solvent under an inert atmosphere. A three-block copolymer suitable for use in the preparation of the sulfonated derivatives thereof may be prepared conveniently by first polymerizing styrene in the presence of lithium secondary butyl, thereafter injecting butadiene or isoprene into the system, continuing polymerization and after all of the monomer has been polymerized then injecting a second portion of styrene and continuing polymerization to form a sequential block polymer having the general structure polystyrene-polyisoprene-polystyrene.

A coupling process may be utilized which comprises the formation of a polymer block of a monovinyl arene such as styrene, injecting a conjugated diene such as butadiene into the system, allowing the formation of a relatively low molecular weight polybutadiene block terminated by the metal ion of the initiator, thereafter injecting a coupling agent into the mixture such as dihaloalkane. This results in the formation of a coupled polymer. Where, in the specification and claims, adjacent essentially identical polymer blocks occur, these are to be regarded as a single polymer block. Thus in the coupling process, where adjacent polybutadiene blocks are coupled, this is regarded as a single polybutadiene block in the coupled product.

If hydrogenation of the polymer is contemplated, the cement formed in the block polymerization process may be utilized for this purpose. The polymers readily hydrogenate when catalysts such as the reduction products of an aluminum alkyl compound with a nickel or cobalt carboxylate or alkoxide are employed.

The following examples illustrate the preparation and pertinent properties of the sulfonated block copolymers:

EXAMPLE I

A block polymer having the structure of polystyrene-polyisoprene-polystyrene with average block molecular weights of 10,000–127,000–10,000 (14.3 g.) was dissolved in dry diethyl ether (1,000 g.), filtered and cooled to 0° C. To the stirred reaction mixture was added slowly a mixture consisting of 8.8 g. chlorosulfonic acid in 100 g. of dry diethyl ether. The reaction temperature was maintained at 0–5° C. for 30 minutes. The product precipitated from the ether solvent as the reaction proceeded, and hydrogen chloride was evolved. At the end of the reaction period, the mixture was allowed to warm to room temperature; the ether was decanted from the product, and the flocculant product was washed three times with ether. The product was dissolved in tetrahydrofuran (6% weight). An analytical sample was prepared by two consecutive precipitations of the polymer from tetrahydrofuran by adding hexane. The analysis of this sample, after drying under vacuum in the presence of phosphorus pentoxide, was: Carbon 70.6%, hydrogen 9.3%, sulfur 5.9%, chlorine <0.1%. This corresponds to 0.185 equivalents of sulfonic acid per 100 g. of product. When a film was cast on glass from tetrahydrofuran solution, it was flexible but not elastic. Upon being wet with water, this film swelled 1600% in volume. It was elastic, but not strong (<150% elongation at break, <200 lbs./sq. in. tensile strength). In 1 N sodium chloride it swelled only 80%, underwent ion exchange with the salt solution, and retained reasonable strength (~300 lbs./sq. in. tensile strength and 200% elongation). The dry film of the sodium salt was flexible unless extreme care was taken to remove all water under vacuum. Then it became quite brittle. The sulfonic acid polymer was soluble in acetone, dimethyl formamide, and dimethyl sulfoxide as well as tetrahydrofuran. The sulfonate salt of the block polymer was insoluble but did disintegrate in tetrahydrofuran and other solvents for polystyrene.

EXAMPLE II

A polystyrene-polyisoprene-polystyrene block copolymer with block sizes of 14,000–72,000–14,000 was dissolved at 5% weight concentration in diethyl ether and the solution was dried over 4 A. molecular sieves. The polymer solution was transferred from the drying agent directly into a stirred reaction vessel. A mixture of chlorosulfonic acid (0.14 mole per 100 g. polymer) in ether at 32% weight concentration was added slowly to the vessel at 0–5° C. The product precipitated slowly from the reaction medium during the 10 minutes residence time. The ether was decanted from the agglomerated product and this product was washed four times with fresh portions of ether in a Waring Blendor. The washed product was dissolved in tetrahydrofuran at 10% weight concentration. Analysis showed: 83.6% carbon, 9.9% hydrogen, 4.9% oxygen, 2.6% sulfur, and 0.11 chlorine. The sulfur analysis 0.081 equivalent per 100 g. is in good agreement with the acid value (0.080 equivalent per 100 g.), obtained by titration of a sample swollen in 1 N sodium chloride. Films cast from this material swelled 80% weight in water, but only 20% weight in physiological saline. When care was taken to avoid exposure of the polymer in the acid form to air, by casting films under nitrogen and neutralizing with alkaline physiological saline, it was possible to obtain good elastic films with tensile strength of 500 lbs./sq. in., 300% elongation at break, and only 20% set at break. Glass plates and plastic devices coated with this polymer show evidence of improved compatibility with blood.

EXAMPLE III

The same block polymer employed in Example I was dissolved in a dry tetrahydrofuran (50 g. polymer in 900 g. tetrahydrofuran). To the rapidly stirred, cooled (0° C.) solution was added 6.1 g. chlorosulfonic acid in 30 g. of tetrahydrofuran. The solution was stirred and maintained at 0–5° C. for 100 minutes. Copius quantities of methanol were used to precipitate and wash a fraction of the product. The analysis: Carbon 84.6%, hydrogen 10.6%, oxygen 5.3%, sulfur 2.6%, and chlorine 0.12%, indicate a level of sulfonation corresponding to 0.08 equivalent per 100 g. of product. Artifacts cast from and coated with the tetrahydrofuran reaction mixture, then neutralized and leached with physiological saline solution displayed practical mechanical properties.

EXAMPLE IV

A block polymer of polystyrene - polyisoprene - polystyrene (15,000–70,000–15,000 molecular weight) was hydrogenated to an iodine number of 30. This polymer (20 g.) in 500 g. of diethyl ether was reacted with 5.5 g. chlorosulfonic acid in 10 ml. ether at 0° C. The reaction became turbid but no precipitate formed during the 20-minute period. Approximately one liter of water was added and the evaporation of ether was facilitated by sweeping the mixture with nitrogen and stirring. The polymer coagulated as a floc which could be filtered, after the last trace of ether was removed under vacuum. The product contained 3.0% sulfur and had an acid equivalent of 0.10 equivalent per 100 g. both of which indicate approximately 90% conversion of the residual elastomer unsaturation to sulfonic acid sites. This polymer swells only 40% weight in water and has a tensile strength of 5,000 lbs./sq. in.

The same block polymer employed in Example II was dissolved in diethyl ether (50 g. in 1200 ml.) and to it was added 18 g. chlorosulfonic acid in 100 ml. The reaction was stirred at —5° C. to +2° C. for about 45 minutes. The ethyl ether was replaced by tetrahydrofuran by stripping out one-half of the initial solvent, adding a liter of the second and removing the remainder of the ethyl ether on a rotary evaporator. The polymer contained 5.4% sulfur, 0.2 equivalent/100 g. Films were prepared from the tetrahydrofuran solution, with care to exclude oxygen. These films, when carefully neutralized and maintained at pH 8–9 in physiological saline, were found to swell 250% weight but to have tensile strength in the swollen state as high as 2600 lbs./sq. in. and 1100% elongation at break. Typical values were 900–1,000 lbs./sq. in. and 800% elongation at break.

The embodiments of the invention in which an exclusive property or privilege is claimed are defined as follows:

1. A block copolymer having the general configuration

A—B—A wherein each B is a selectively sulfonated conjugated diene polymer block having an average molecular weight between about 20,000 and 250,000, and each A is a monovinyl arene polymer block having an average molecular weight between about 5,000 and about 75,000 and wherein the block copolymer comprises between about 1 and 10% by weight of bound sulfur.

2. A block copolymer according to claim 1 wherein the polymer comprises between about 2–7% by weight of bound sulfur.

3. A process for the preparation of a sulfonated block copolymer according to claim 1 which comprises reacting chlorosulfonic acid with the block polymer in the presence of an ether at a temperature below about +10° C., whereby selective sulfonic acid sulfonation of the conjugated diene polymer blocks occurs with substantially no reaction with the monovinyl arene polymer blocks.

4. A process according to claim 3 wherein the ether is a dialkyl ether.

5. A process according to claim 3 wherein the ether is tetrahydrofuran.

References Cited

UNITED STATES PATENTS

| | | | |
|---|---|---|---|
| 2,645,621 | 7/1953 | D'Alelio | 260—2.2 |
| 3,471,431 | 10/1969 | Mann et al. | 260—94.7 |

JAMES A. SEIDLECK, Primary Examiner

U.S. Cl. X.R.

260—5, 79.3 R, 876 B, 879 R